Patented Aug. 27, 1940

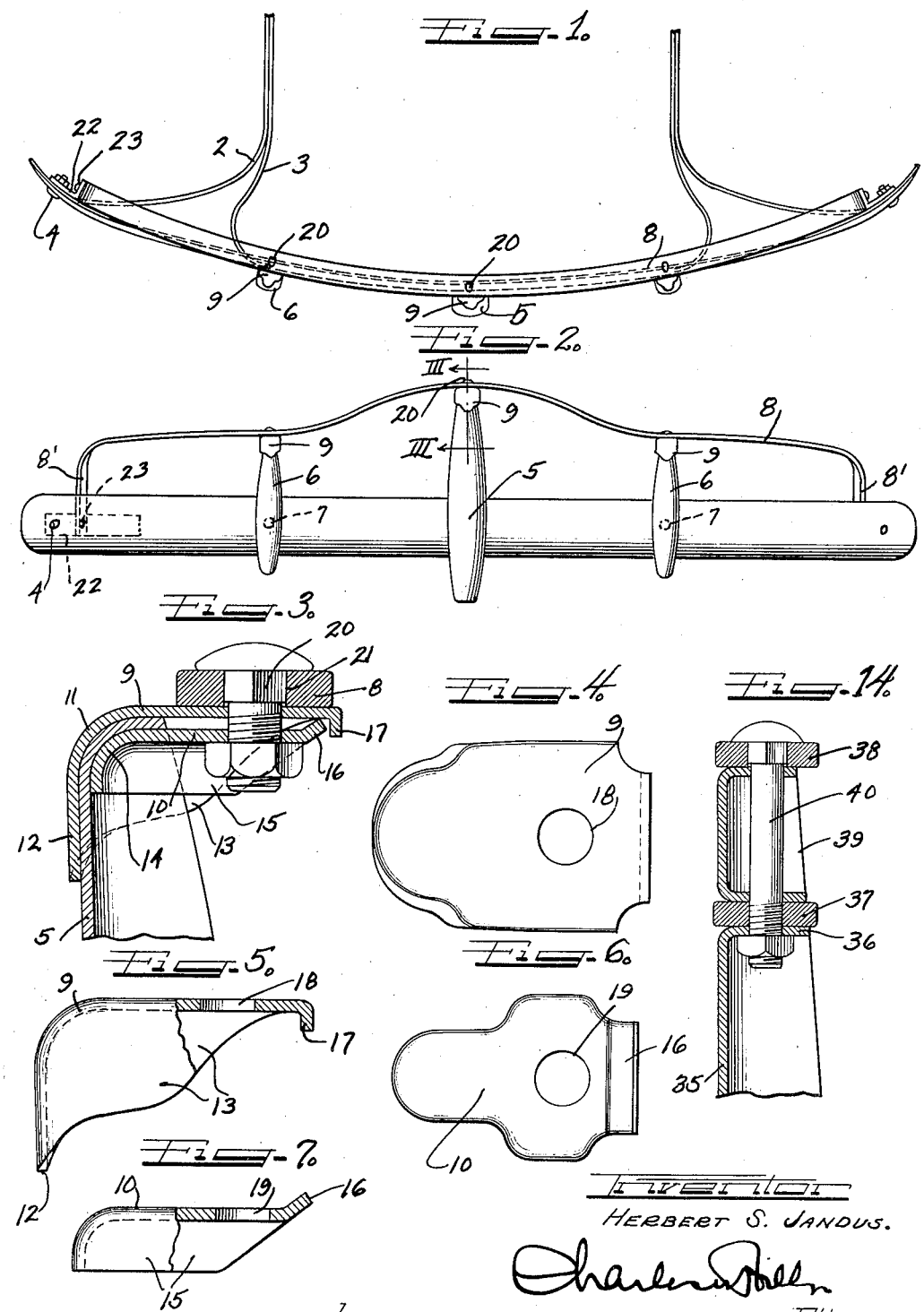

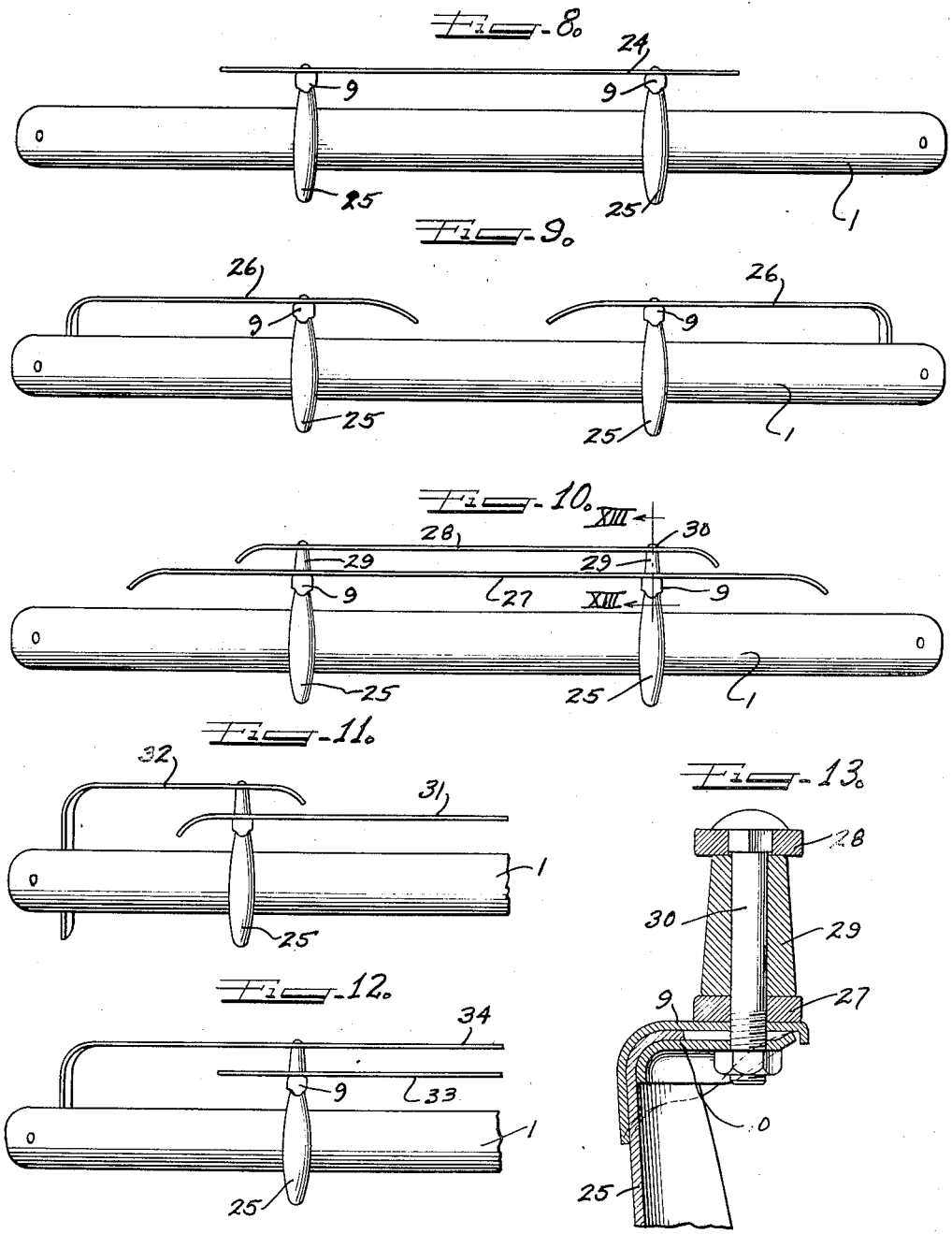

2,213,044

UNITED STATES PATENT OFFICE 2,213,044

BUMPER STRUCTURE

Herbert S. Jandus, Detroit, Mich., assignor to Houdaille-Hershey Corporation, Detroit, Mich., a corporation of Michigan Application March 31, 1939, Serial No. 265,093

7 Claims. (Cl. 293—55)

My invention relates to bumper structures for automotive vehicles and particularly to main bumper and guard structure arrangement and assembly.

An important object of the invention is to provide a bumper structure in which transversely extending guard members are mounted on the bumper impact bar and bars or rails are secured on the upper ends of the guard members.

A further object is to provide simple fittings in the form of clamp structures by means of which the auxiliary bars or rails may be secured to the top of ordinary transverse guard members without any change in such members so that such auxiliary bars or rails may be readily clamped in place on standard types of transverse guard members on a bumper impact bar.

My invention also incorporates other features and improvements and the various features of the invention are shown incorporated in the structure shown on the accompanying drawings, in which drawings:

Figure 1 is a plan view of one form of assembly;

Figure 2 is a front view;

Figure 3 is an enlarged section on plane III—III Figure 2;

Figure 4 is a plan view of an outer clamping element;

Figure 5 is a side view of the clamping element shown in Figure 4;

Figure 6 is a plan view of an inner clamping member;

Figure 7 is a side elevation of the clamping element of Figure 6;

Figures 8, 9, 10, 11 and 12 are front elevations of modified arrangements;

Figure 13 is an enlarged section on plane XIII—XIII, Figure 10; and

Figure 14 is an enlarged cross section showing a modified arrangement for securing two auxiliary bars or rails to the transverse guard members.

The bumper structure as disclosed on Figures 1 and 2 comprises a bumper impact horizontal bar 1 supported at its ends from the vehicle chassis by outer and inner supporting bars 2 and 3, the bars being anchored at their inner ends to the corresponding chassis side beams. At their forward ends, the outer bars 2 are deflected laterally outwardly to be secured to the bumper bar 1 as by bolts 4, the inner bars 3 being also secured at their forward ends to the bumper bar.

On the bumper impact bar 1, a transversely extending guard member 5 is secured and between this guard member and the ends of the bar other transverse guard members 6 are secured, and the securing means for the guard members 6, such as bolts 7, may serve also to secure the inner supporting bars 3 to the impact bar. The middle guard element 5 is preferably extended a greater distance above and below the impact bar in order to afford more protection for the automobile radiator and grille structure.

Additional guard and fender structure is preferably provided and as shown on Figures 1 and 2 such structure is in the form of a bar or rail 8 which may be of flat metal stock and which is secured to the tops of the transverse guard members and at its ends to the impact bar 1. Simple means and arrangement are provided for securing the auxiliary guard bar so that it may be readily attached to standard types of cross guard members, or installed as additional protection on bumper structures on which standard types of cross guard elements are mounted.

Referring to Figures 3 to 7, the securing means for the auxiliary guard element is in the form of a clamping structure comprising an outer clamping member 9 and an inner clamping member 10. The cross guard members shown on Figures 1 and 2 are of channel shaped cross section and the clamping members are shaped to fit and receive the upper ends of the guard members. The clamping members may be stamped integral from sheet metal. The outer clamping member 9 is of L-shaped cross section with the curved portion 11 fitting the curvature of the upper end of the guard member and with the vertical portion 12 engaging the front of the guard member, the horizontal or top part extending a distance rearwardly of the guard member to provide a seat for the auxiliary guard bar 8. The clamping member 9 is also provided with side flanges 13 which engage around the sides of the guard member at the top thereof as clearly shown in Figure 3.

The inner guard member is also of L-shaped cross section, its forward end being curved as indicated at 14 to fit into the upper end of the guard member, and flanges 15 are provided for engaging with the side walls of the guard member. At its rear end the inner guard member has the upward deflection 16 for engaging with the rear end of the outer clamping member 9, and the outer member may have the downward deflection 17 at its end, as shown.

The outer and inner clamping members have bolt holes 18 and 19 respectively for receiving a securing member such as a bolt 20 extending through a bolt hole 21 in the auxiliary guard bar 8. When the bolt is tightened, the clamping members will securely clamp between them the upper end of the respective guard member to form a rigid support for the auxiliary guard bar 8. The clamping structure parts may be designed to fit standard types of cross guard members so that such guard members need not be altered or any work required thereon for support of an auxiliary guard bar such as a bar 8.

As shown by Figure 2, the bar 8 is deflected so as to seat against and be secured to the guard structures 5 and 6 by the clamping structures.

For securing the ends of the bar 8, L brackets 22 may be secured to the impact bar 1 by the bolts 4 which secure the outer supporting bars 2, and the ends 8' of the auxiliary bar 8 are deflected downwardly to be secured to the rearwardly extending legs of the brackets, as by bolts 23. With the securing means and arrangement shown and described, an auxiliary guard bar or rail may be readily and easily applied on vehicles provided with cross guard members on the bumper impact bars.

In the modified arrangement shown on Figure 8, an auxiliary bar or rail 24 is mounted on two transverse guard members 25 secured to the bumper bar equal distances outwardly from the center thereof.

In the modified arrangement shown by Figure 9, two auxiliary bars or rails 26 are shown in association with the two guard members 25, each auxiliary bar being mounted at its inner end on one of the guard members and with its outer end deflected downwardly for attachment to the impact bar, and such attachment may be the same as that provided for the ends of the bar 8 on Figures 1 and 2.

In the modified arrangement of Figure 10, the two transverse guard members 25 support two auxiliary guard bars or rails, one above the other, these bars 27 and 28 being shown as terminating short of the ends of the impact bar. Figure 13 shows the manner in which the bars may be secured to the transverse guard members. Clamping structures like those shown on Figure 3 may be used. The lower auxiliary bar 27 will be mounted on the clamping structure and the upper auxiliary bar 28 will be held in proper position above the lower bar 27 by spacer sleeves or fittings 29, bolts 30 extending through the auxiliary bars, the spacers, and the clamping structures to rigidly secure the entire assembly.

In the modified arrangement of Figure 11, the two transverse guard members 25 have a lower auxiliary guard bar or rail 31 extending between and secured to the tops thereof, with upper auxiliary bars 32 extending outwardly from each of the transverse guard members and deflected downwardly at their outer ends for securing to the bumper impact bar in a manner such as shown by Figures 1 and 2. The securing of the upper and lower bars 31 and 32 to the transverse guard members may be in the manner as shown by Figure 13.

In the modified arrangement of Figure 12, a lower auxiliary guard bar or rail 33 extends between and is secured to the tops of the transverse guard members 25, and an upper auxiliary bar 34 extends the entire distance between the transverse guard members and with its outer ends deflected down for securing to the bumper impact bar in a manner such as shown in Figures 1 and 2.

Figure 14 shows a modified arrangement for securing upper and lower auxiliary guard bars or rails. The transverse guard members 35 may have flat upper ends 36 on which a lower bar 37 rests, and where an upper auxiliary bar 38 is provided, suitable spacer fittings 39 may be utilized and bolts 40 extended through the bars, the spacers and the top walls of the transverse guard members 35 for securing the entire assembly together.

I thus provide improved automobile bumper structure which will afford adequate protection and of which the parts can be readily and economically manufactured and assembled. It will be noted that the auxiliary guard bars, when in the form of flat bar stock, will be arranged edgewise to thus afford the greatest resistance strength against impact.

I have shown practical and efficient embodiments of the invention but I do not desire to be limited to the exact construction and arrangement shown and described as changes and modifications may be made without departing from the scope and spirit of the invention.

I claim as follows:

1. An automobile bumper structure comprising a horizontally extending impact bar, a transversely extending guard member mounted on said impact bar, an auxiliary horizontally extending guard bar above the impact bar, clamping structure comprising outer and inner clamping members for receiving the upper end of said transverse guard member, a common means for securing said auxiliary bar to the clamping structure and securing the members of said clamping structure to clamp the transverse guard member, and means for securing the outer end of said auxiliary bar.

2. An automobile bumper structure comprising a horizontally extending impact bar, a number of transverse guard members mounted on said impact bar, a guard rail above the impact bar, clamps comprising outer and inner cap-shaped members for fitting against the outside and inside of the upper end of each of said transverse members, means securing said clamping members together for rigidly clamping the cross members, said securing means serving also to secure said guard rail to the clamping structures.

3. An automobile bumper structure comprising a horizontally extending impact bar, transverse guard members mounted on said impact bar, a guard rail above said impact bar, supporting members for said guard rail each comprising outer and inner cap-shaped clamping members for engaging against the inside and outside of the upper end of a transverse guard member, and bolts extending through said guard rail and the clamping members of the clamping structures to secure the clamping members and bar together and the clamping members in clamping engagement with the respective transverse guard members.

4. An automobile bumper structure comprising a horizontally extending impact bar, a number of transverse guard members mounted on said bar to extend upwardly therefrom, a guard rail above said impact bar, clamping structure for each transverse guard member comprising outer and inner cap-shaped clamping members for receiving between their outer ends the outer end of a transverse guard member and extending rearwardly to form a support for the guard rail, and bolts securing the respective clamping members together to clamp the transverse guard member, said bolts serving also to secure the guard rail to the clamping structures.

5. An automobile bumper structure comprising a horizontally extending impact bar, a transversely extending guard member of channel shape cross-section mounted on said impact bar, an auxiliary horizontally extending guard bar above the impact bar, clamping structure comprising outer and inner clamping members, said outer clamping member receiving the upper end of said guard member to extend around the front and side walls thereof and rearwardly across the top thereof, said inner clamping member extending into the guard member between the side walls thereof, and a common means for securing said auxiliary bar to said clamping structure and securing the members of said clamping structure to clamp said transverse guard member.

6. An automobile bumper structure comprising a horizontally extending main impact bar, a transverse guard member mounted on said main impact bar and securing means for securing it thereto, a guard rail above the impact bar, clamping structure independent of said securing means and comprising outer and inner clamping members for receiving the upper end of the said guard member, bolt means for securing said clamping members together to rigidly clamp said guard member, said bolt means serving also to secure said guard rail to the clamping structure.

7. An automobile bumper structure comprising a horizontally extending impact bar, a hollow guard member mounted on said impact bar to extend transversely thereof, a guard rail above the impact bar, a detachable clamp structure for the upper end of said guard member forming a support for said guard rail, said clamp structure comprising outer and inner clamping members receiving between them the walls of the guard member at the upper end thereof, and securing means securing said clamping members in clamping engagement and said guard rail thereto.

HERBERT S. JANDUS.